C. J. AXTELL.
CAR LIGHTING SYSTEM.
APPLICATION FILED APR. 29, 1918.
1,330,571.
Patented Feb. 10, 1920.
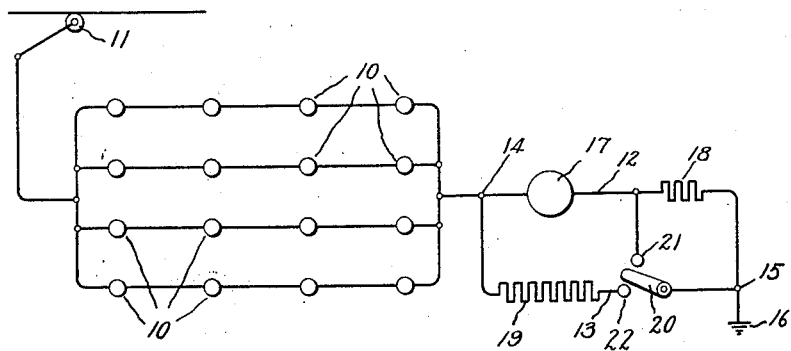
Inventor:
Clinton J. Axtell,
by Albert G. Davis
His Attorney.

UNITED STATES PATENT OFFICE.

CLINTON J. AXTELL, OF SCHENECTADY, NEW YORK, ASSIGNOR TO GENERAL ELECTRIC COMPANY, A CORPORATION OF NEW YORK.

CAR-LIGHTING SYSTEM.

1,330,571.  Specification of Letters Patent.  Patented Feb. 10, 1920.

Application filed April 29, 1918. Serial No. 231,424.

*To all whom it may concern:*

Be it known that I, CLINTON J. AXTELL, a citizen of the United States, residing at Schenectady, in the county of Schenectady, State of New York, have invented certain new and useful Improvements in Car-Lighting Systems, of which the following is a specification.

My invention relates to a car lighting system combined with an electric light, such as a headlight, and has for its object the improvement of a system of this character.

It is frequently desirable to vary the luminosity of the headlight of a car, particularly on such a car as is used both for urban and interurban service. In the country it is, of course, desirable to furnish the car with a headlight giving a beam of light of high intensity, since the car there usually runs at a high rate of speed and the train operator must depend solely upon the light emitted from the headlight to distinguish objects on the track ahead. Within city limits, on the other hand, it is usually undesirable to use a beam of high intensity and in fact many cities have ordinances forbidding the use of such beams. It is, therefore, desirable to have a headlight which may be operated either at high luminosity or low luminosity as desired and in accordance with my invention, this result may be produced without substantially affecting the voltage of the lights of the car.

My invention will best be understood by reference to the accompanying drawing, the single figure of which is a diagrammatic view illustrating my invention applied to an electric vehicle.

Referring now to the drawings, 10 are the electric lights, usually incandescent lamps, for lighting the interior of the car, and these lights are supplied with electric energy by the trolley 11. These lights are here shown in multiple series; they are suitably clustered for distributed illumination. A branched circuit comprising two branches, 12 and 13, is connected to the cluster of car lights, the branches terminating at the points 14 and 15, the system being grounded at 16. The one branch 12 includes a special electric light 17, which will usually be an incandescent lamp, and will usually be used as the headlight of the car. This branch also includes an impedance 18, which will be a resistance when the lights are supplied with direct current, as is usually the case, but which may be a reactance or resistance in the event that alternating current is used. The other branch 13 includes a resistance 19, in case of a direct current, but which may be a reactance or resistance in case alternating current is used. A switch 20 coöperates with stationary contacts 21 and 22. The former is connected to the branch 12 between the headlight 17 and the resistance 18 and the latter contact, 22, is connected to the resistance 19. When the switch 20 engages the contact 21, a shunt circuit around the resistance member 18 is formed through which the circuit of the headlight 17 is completed to ground, and when the switch engages the contact 22, the branch circuit 13 is closed through the resistance member 19 and the switch 20 to the ground, the current for the headlight 17 at this time passing through the resistance 18. Now the resistance members 18 and 19 are so designed that the total resistance between the points 14 and 15 is the same when the switch 20 is in engagement with the contact 21 so that the lamp 17 is the only resistance included between the points 14 and 15, as when the switch 20 engages the contact 22 thus completing the two branches, the one including the incandescent lamp 17 and resistance 18 and the other the resistance member 19.

When it is desired to operate the special or headlight at full luminosity, the switch 20 will be placed on the contact 21 and no resistance other than that of the car lights will be included in series with the headlight. But when it is desired to operate the headlight at low luminosity, the switch 20 is moved into engagement with the contact 22 when the two branches of the circuit will be completed between the points 14 and 15. Because of the fact that the resistance 18 is at this time included in series with the headlight 17 and also due to the fact that part of the total current is shunted around the headlight through the branch 13, the headlight will at this time run at a lower luminosity. At the same time, since the total resistance between the points 14 and 15 is the same as before, the voltage across the car lights will remain constant or substantially constant and their luminosity, therefore, will not be affected. When I state that the voltage across the car lights remain constant, it is with the understanding that the voltage on the supply circuit remains constant. In practice, however, the trolley voltage varies more or less, but such variation does not appreciably affect the relative luminosities of the interior and headlights, and my invention is not intended to compensate for this voltage variation. When, therefore, in the claims I refer to means for maintaining the voltage constant on the car lights and on the branch circuit, it is with the understanding that the voltage remains sensibly constant on the supply circuit.

Since the headlight with which my invention is commonly used, is usually operated at full brilliancy between city limits and is dimmed within the city limits, it will be understood that the resistances 18 and 19 will ordinarily be designed for the voltage which exists on the city trolley line which, as is well known, is frequently somewhat higher than is present on the interurban line.

While I have described my invention as embodying a concrete structure and as operating in a specific manner in accordance with the provisions of the patent statutes, it should be understood that I do not limit my invention thereto, since various modifications thereof will suggest themselves to those skilled in the art without departure from the spirit of my invention, the scope of which is set forth in the annexed claims.

It should particularly be understood that while my system of lighting is specially adapted for car lighting, it is equally adapted for use in other locations where it is required that the cluster of lights for distributed lighting is to be maintained at a certain constant brilliancy within a wide range. It is also clear that the number of lights which constitute the cluster for general or distributed lighting is not limited by my invention; it may be larger than that shown in the drawing and it may be much smaller, and a single light of suitable capacity would be the equivalent of a cluster.

What I claim as new and desire to secure by Letters Patent of the United States, is:—

1. In a car lighting system, the combination, with a source of substantially constant-potential electric energy and a cluster of electric lights fed thereby, of a branched circuit connected in series to said cluster, one branch of which includes a special electric light and an impedance in series therewith, a shunt about said impedance, a switch for opening and closing said shunt to vary the voltage across said special electric light, and means for maintaining the voltage on said branched circuit constant during such variation.

2. In a car lighting system, the combination with a source of substantially constant-potential electric energy and a cluster of incandescent lights fed thereby, a special light in series with the cluster, an impedance in series with the special light, a switch for opening and closing a shunt around said impedance to vary the luminosity of the special light, and means for maintaining a substantially constant voltage on the cluster during said variation.

3. In a car lighting system, the combination with a source of substantially constant-potential electric energy and a cluster of incandescent lights fed thereby, a branched circuit connected in series to said cluster, one branch of which includes a special electric light and a resistance in series therewith, and the second branch of which includes a resistance member, and a switch for connecting the two branches in parallel and for disconnecting the second branch and simultaneously forming a shunt around the resistance in the first branch.

In witness whereof, I have hereunto set my hand this 25th day of April, 1918.

CLINTON J. AXTELL.